July 19, 1938. F. SOUCZEK Re. 20,805

DEVICE FOR GRINDING AND SHARPENING RAZOR BLADES

Original Filed May 13, 1933

Inventor:
F. Souczek
By R. F. Stendroth
Atty

Reissued July 19, 1938

Re. 20,805

UNITED STATES PATENT OFFICE 20,805

DEVICE FOR GRINDING AND SHARPENING RAZOR BLADES

Ferdinand Souczek, Brusau, Czechoslovakia, assignor, by mesne assignments, to Siemens, Incorporated, New York, N. Y.

Original No. 2,004,838, dated June 11, 1935, Serial No. 670,980, May 13, 1933. Application for reissue March 16, 1938, Serial No. 196,200. In Czechoslovakia May 31, 1932

25 Claims. (Cl. 51—161)

Figure 1:
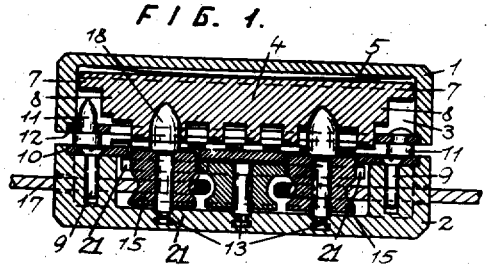

The invention relates to a device for the grinding and sharpening of razor blades and particularly to a device which makes it possible to work simultaneously on all four cutting surfaces of a double edged razor blade.

In known grinding devices of this type, the movement between the razor blade and the grinding agent which is necessary for the grinding is generally only rectilinear and of a definite type of stroke, regardless of whether it is parallel, inclined or perpendicular to the edge and whether a grindstone or grinding rolls are used. However, this type of grinding favors the production on the sides of the edge of the blade of grooves which make it difficult or even impossible to obtain a complete grinding of the sides of the edge. The grinding, moreover, results in subjecting the blades to an injurious bending stress.

Grinding devices are also known wherein a circular movement relative to the grinding members is imparted to the blade during the grinding process. However, in this case, it is necessary either to bend the cutting edges of the blade onto the grinding surfaces of the grinding agent by means of a special tensioning device, or else mutually inclined grinding surfaces have to be provided and the blade circularly reciprocated by a rocking type of movement. The first-mentioned device involves the disadvantage that the tensioning of the blade makes it doubtful that a uniform application of the sides of the edge to the grinding members can be obtained, while with the second device there is no assurance that the correct grinding angle will be maintained, since the springs which press the blade down onto the grinding surfaces produce a greater or less bending depending upon the thickness thereof.

The present invention has for its object to enable extremely fine grinding to be obtained by a curvilinear grinding motion between the blade and grinding means and by obviating any bending stresses on the blade, provision being made to ensure that the cutting edge is not contacted by the grinding means in any part of the curvilinear grinding motion in which the grinding proceeds towards the cutting edge.

According to the invention this object is attained by so guiding spring-loaded grinding members in the longitudinal sides of a pair of casing members detachably fitted together that a razor blade clamped therebetween and capable of curvilinear motion in its own plane forms with said grinding members a wedge-shaped driving means whereby the grinding members during each curvilinear motion of the blade not only move perpendicularly thereto but also execute a reciprocatory movement transversely with respect to the cutting edges. Consequently the grinding members are subjected to a raising and lowering movement as well as to a pendulous movement by the curvilinear motion of the razor blade. Whereas the former movement facilitates the grinding of the blade, in the latter the grinding angle is subjected to a periodic alteration and accordingly it is ensured that the grinding shall not proceed towards the cutting edge of the razor blade. The magnitude of the periodic alteration of the grinding angle is determined by free play of the grinding members in their guides which depends entirely on the accuracy of the construction.

A constructional form of the invention is illustrated by way of example in the accompanying drawing in which:—

Figure 2:
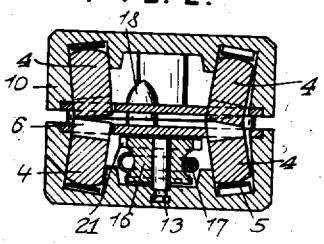
Figure 3:
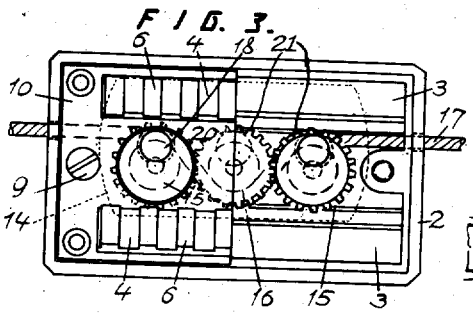

Figure 1 is a longitudinal section through the grinding members in the upper part and the operating or driving means in the lower part of a razor-blade grinding and sharpening device according to the invention, Figure 2 is a cross-sectional elevation of the device in closed position with a razor blade clamped therein, Figure 3 is a plan view of the lower part of the casing, the left hand part of the figure showing the parts ready for use and the right hand part of the figure showing the parts after removal of the cover plate and grinding members.

Figure 8:
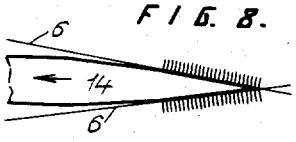
Figure 9:
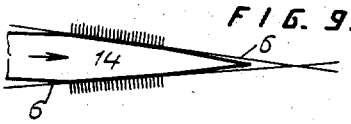

Figures 4 to 7 are enlarged cross-sectional views through a grinding member and the operating or driving means, and show four positions of the grinding member relatively to the razor blade during a grinding operation, Figures 8 and 9 are diagrams illustrating the effect of altering the grinding angle on the cutting edge of the blade or on the grinding operation.

In the construction illustrated the device comprises a pair of similar casing members 1 and 2 made of artificial material and grinding members 4 which are accommodated together with flat springs 5 in longitudinal grooves 3 provided at both sides of each of the members 1 and 2. The grinding members are in the form of blocks, also of artificial material and are provided at their ends adjacent the blade with seven teeth 6. Grinding means in the form of powder is pressed between the teeth which are so arranged that they may engage with slight play in the gaps between the teeth of the oppositely disposed grinding members. The ends of the grinding members adjacent the flat springs are curved and terminate in extensions 7 which permit the pendulous movement and also the raising and lowering of the grinding members without axial play. A cover plate 10 is secured by means of counter-sunk screws 9 on the casing and serves to limit the two possible movements of the grinding members inasmuch as the longitudinal slots for the passage of the grinding teeth 6 are so dimensioned that the shoulders 8 at both ends of each grinding member are able to bear on the plate against the pressure of the spring 5 and so that the slot is made wider than the grinding teeth. Guide pins 11 are riveted to the cover plate 10 at the corners and are provided with collars resting on said cover plate. Holes 12 are provided in the other cover plate opposite to the pins 11 so that the casing parts 1 and 2 may be readily fitted together. This construction ensures that the two casing parts may be held closed by hand at a certain distance from one another without shifting so that the teeth of one grinding member may engage in the gaps between the teeth of another grinding member without relative contact.

Three bearing pins 13 shown in Figures 1 and 3 are embedded in the bottom of the lower half 2 of the casing. A pair of grooved rollers 15 for rotating a razor blade 14 and an intermediate grooved roller 16 are rotatably supported on the pins 13. All the rollers are provided beneath the cover plate with toothed wheels 21 having the same number of teeth as one another. An operating cord 17 extending out from opposite ends of the casing is guided around the rollers as shown in Figures 1 and 3 and effects rotation in the same direction of carrier pins 18 eccentrically disposed on both outer rollers 15. The pins 18 are provided with hardened steel sleeves 19. Circular holes 20 in the cover plate 10 enable the pins 18 to project therethrough but do not permit the outer rollers to drop out.

It is of course obvious that the diameters of the carrier pins 18 and also their distance from one another coincide with the diameters and spacing of the holes in a razor blade. On the other hand, the distance between the inner edge of the grinding teeth on one side and the outer edge of the grinding teeth on the other side must be less than the width of the razor blade in order to ensure that the cutting flanks of the latter never pass out of engagement with the grinding members.

As shown in the cross-sectional views of the drawing, the grinding members are inclined inwardly so that the grinding surfaces of the inter-engaging grinding teeth together form a grinding angle corresponding to the cutting angle of the razor blade.

When the razor blade is positioned on the carrier pins 18 and the device is closed, the blade prevents the inter-engagement of opposing grinding teeth and, under the opposite but equal spring forces constituting the grinding pressure, is accurately positioned centrally of the gap formed between the two halves of the casing by the collars on the guide pins 11 when the grinding members on both sides are not overlapped by the razor blade to the same extent (see Figure 2).

If now the somewhat tensioned operating cord 17 is pulled from side to side, or, in the case where the cord is stationary, the grinding device itself is reciprocated along the cord, the razor blade will execute a curvilinear movement in its own plane. Owing to the free gap between the two halves of the casing both in the direction of the cord and transverse thereto, the curvilinear movement of the blade is manifested as a reciprocatory movement equal to twice the eccentricity of the carrier pins 18. The cutting edge of the razor blade behaves as a wedge between the inclined grinding surfaces of two grinding members that form the grinding angle so that when a cutting edge is moved towards the grinding angle the two grinding members are forced apart against the action of the springs acting upon them and when the cutting edge recedes from the grinding angle the two grinding members are caused to approach each other under the action of their springs without ceasing to bear on the cutting flanks of the blade, the grinding teeth at the same time engaging in one another. In the following the former movement is referred to as the advance while the latter is referred to as the return of the cutting edge.

Figure 4:
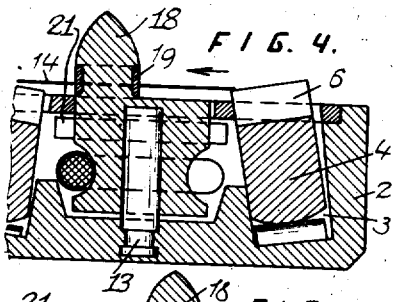

The grinding operation according to the invention is illustrated by Figures 4 to 7. In Figure 4 the razor blade 14 has completed its return movement in relation to the right hand grinding member 4 which abuts the inner edge of the longitudinal slot in the cover plate 10. In this position the grinding tooth forms the maximum grinding angle, Figure 8, with that of the upper grinding member (not illustrated). The carrier pin 18 is in its extreme left hand position. Whereas in this position the right hand grinding member projects to its fullest extent from the cover plate the left hand grinding member (in relation to which the blade has just terminated its advance movement) is in its lowermost position with the teeth thereof butting the outer edge of the slot in the cover plate.

If the carrier pin 18 is now given a further slight movement (Figure 5) the blade commences to move in the opposite direction, this having the effect of swinging the two grinding members to the right. The return is thus initiated for the left hand cutting edge associated with the enlarged grinding angle and the advance movement is initiated for the right hand cutting edge associated with the reduced grinding angle.

Figure 5:
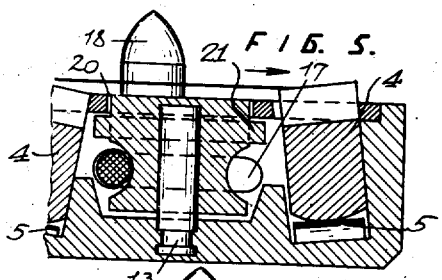
Figure 6:
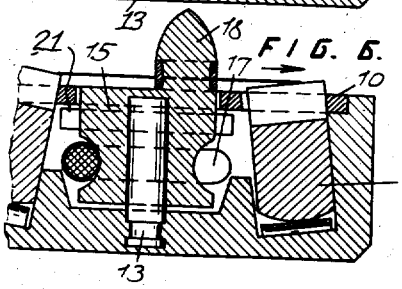
Figure 7:
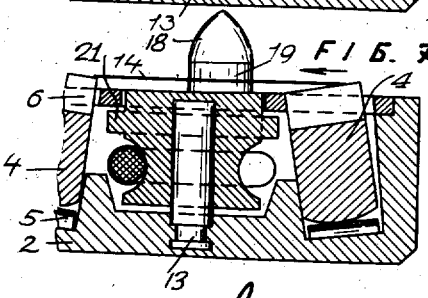

It will be apparent from the following that the alteration in the grinding angle takes place immediately after the carrier pin moves from the dead centre position illustrated in Figure 4 or 6. The spring pressure acting on the cutting flank of the razor blade imposes a resistance to the displacement of the cutting flank on the grinding surface of the grinding member, such resistance being dependent upon the amount of friction. As, however, this force is very great in comparison with the force necessary for adjustment of the grinding members it follows that the grinding member must first of all be moved into contact with the slot in the cover plate before the grinding operation proper can commence. When this occurs, as illustrated in Figure 5, and upon continued advance of the cutting edge the grinding member is gradually forced into the casing against the pressure of the spring until the other dead centre position of the carrier pin is attained (Figure 6). Upon further rotation of the carrier pin roller in either direction the blade is made to move in the opposite direction in relation to the grinding members and before the grinding operation can be recommenced the alteration of the grinding angle must take place in the manner above described (Figure 7). Whereas the right hand grinding member is now pressed outwardly by spring pressure in the subsequent return movement of the blade, the left hand grinding member is forced during advance movement of the blade into the casing against spring pressure until the position illustrated in Figure 4 is attained whereupon the sequence of operations is repeated.

It is apparent that in the advance of the cutting edge, (Figure 9), the grinding angle is smaller than in the return (Figure 8), and that in the former case the grinding operation is only performed on the rear thick portion of the cutting edge, whereas the cutting edge proper is only ground in the return movement. A further very noteworthy peculiarity in this grinding operation is the fact that the grinding pressure exerted during the advance of the blade is greater than the pressure exerted during the return movement. This is because the grinding member during its upward and downward movement in the direction of the spring pressure is pressed against the walls of its guide so that there occurs a frictional force which checks the aforesaid movement of the grinding member. Whereas during the advance of the cutting edge the grinding member is moved against its spring the frictional force on the walls must be overcome in addition to such spring pressure by the cord operating means so that the grinding pressure is greater than the frictional force. On the other hand, during the return of the cutting edge this frictional force must be overcome by the spring so that in this case the grinding pressure is less than such force.

As during the advance of the cutting edge and the application of the greater grinding pressure only the rear thick part of the cutting edge is ground while the cutting edge proper remains untouched, during the return of the cutting edge the cutting edge proper is acted upon and the entire grinding operation may therefore be regarded as being composed of simultaneous preliminary grinding and sharpening stages. Figure 9 illustrates the preliminary grinding while Figure 8 illustrates the sharpening of the blade.

Instead of employing grinding members 4 in block form a group of individual grinding teeth specially guided in grooves may be employed, and with both forms of grinding members the necessary free play for their pendulous movement may be obtained by tapering the grinding members towards the grinding surfaces instead of by enlarging the guides for said members. Further, instead of making the guides inclined (i. e. perpendicular to the cutting flanks of the blade) they may be arranged at 90° to the body of the blade in which case the grinding members would be appropriately inclined for the purpose of obtaining the grinding angle.

It is to be understood that the hereinbefore described means of operation by a cord may be substituted by any other suitable device for effecting curvilinear movement of the razor blade.

What I claim is:—

1. A grinding device for double-edge razor blades comprising grinding means for simultaneously operating on the four sides of the cutting edges of a blade, and means for imparting a curvilinear movement to a blade to be ground or sharpened by said grinding means, such movement taking place in a plane parallel to that containing the cutting edges.

2. A grinding device for double-edge razor blades comprising grinding means for simultaneously operating on the four cutting edges of a blade, and means comprising a pair of cranks and operating cord for imparting a curvilinear movement to a blade to be ground or sharpened by said grinding means, such movement taking place in a plane parallel to that containing the cutting edges.

3. A grinding device for double-edge razor blades comprising a body, a covering plate therefor, springs carried by said body, grinding means in said body for simultaneously operating on the four cutting edges of a blade, said grinding means being guided by the body and by the covering plate with rough clearance in order to allow a pendulous and swinging movement of the grinding means for the purpose of pressing said members by said springs against the cutting edges of the blade.

4. A grinding device for double edge razor blades, comprising four grinding members with inclined grinding surfaces for the simultaneous treatment of all four edge surfaces of a blade, rotatable driving means for imparting circular grinding movement relative to the grinding members to a blade to be ground by the said grinding members in the plane of the blade, and springs acting on each of the said grinding members in such manner that it is constantly urged toward the juxtaposed edge surface of the said blade.

5. A grinding device for double edge blades, comprising four grinding members for the simultaneous treatment of all four edge surfaces of a blade, rotary drive means for imparting circular grinding movement relative to the grinding members to a blade to be ground by the said grinding members in the plane of the blade, and springs acting on each one of the said grinding members in such manner that it is constantly urged toward the juxtaposed edge surface of the said blade, the said grinding members being provided with comb-like interrupted grinding surfaces and being superposed in such manner that at times the projecting portions of the grinding surfaces of one grinding member extend into the intermediate spaces of the grinding surfaces of the opposed grinding member.

6. A grinding device for double edge razor blades, comprising four grinding members with inclined grinding surfaces for the simultaneous treatment of all four edge surfaces of a blade, springs independently urging each grinding member toward the juxtaposed edge surface of a blade to be ground, and a pair of crank pins for holding the blade, said two crank pins being designed for rotating in the same direction and imparting a circular movement relative to the grinding members in the plane of the blade to be ground, without bending the latter.

7. A grinding device for double edge razor blades comprising four grinding members for the simultaneous treatment of all four edge surfaces of a blade, springs independently urging each of the grinding members toward the juxtaposed edge surface of a blade to be ground, a pair of crank pins for holding the blade, said two crank pins being designed for rotating in the same direction and imparting a circular grinding movement in the plane of the blade relative to the grinding members, without bending the said blade, grooved disks on the axles of the said crank pins, and a band extending around the said grooved disks and extending out of the housing for imparting rotary movement to the said crank pins.

8. A grinding device for double edge razor blades comprising spring-pressed grinding members for the simultaneous treatment of all four edge surfaces of a blade, and rotary drive means for imparting a circular grinding movement relative to the grinding members to the blade to be ground by the said grinding members, the latter being guided in the direction transverse to the cutting edge of the blade to be ground with so much room for play that an oscillatory movement of the grinding members is possible in the said direction.

9. A razor blade sharpener comprising abrading means providing inclined sharpening surfaces, spaced lugs disposed centrally of said sharpening surfaces to hold positively a safety razor blade whereby the cutting base of the latter are placed in juxtaposition to said sharpening surfaces and means for imparting similar individual revolvable movements to said lugs.

10. A razor blade sharpener comprising abrading means to provide juxtaposed and oppositely inclined sharpening surfaces, a holder including spaced actuating members for a razor blade to hold positively both the cutting edges of said blade in contact with said sharpening surfaces, and means for imparting individual revolvable movements to each of said actuating members.

11. A razor blade sharpener comprising abrading means to provide juxtaposed and oppositely inclined sharpening surfaces, a holder including spaced actuated members for a razor blade to hold positively both cutting edges of said blade in contact with said sharpening surfaces, means for imparting individual revolvable movements to each of said actuating members and means for exerting pressure on the sides of the edges of said razor blade.

12. A razor blade sharpener comprising a lower member and an upper member, abrading members located in said lower member and spaced from each other, a holder located intermediate said abrading members to receive a razor blade, means upon said upper member so that when the latter is placed in superposed position upon said lower member, pressure is exerted upon the razor blade and means for imparting a revolvable movement to said razor blade holder.

13. A razor blade sharpener comprising a lower member and an upper member, abrading members located in said lower member and spaced from each other, a holder located intermediate said abrading members to receive a razor blade, means upon said upper member so that when the latter is placed in superposed position upon said lower member pressure is exerted upon the razor blade and means for imparting a revolvable movement to said razor blade holder, a portion of said means being exterior of said lower member.

14. A razor blade sharpener comprising a casing having a lower member and an upper member therefor, two spaced abrading members held in said lower member and providing juxtaposed and oppositely inclined sharpening surfaces, a holder to receive a razor blade to position it centrally of said sharpening surfaces, spring means secured to said upper member for exerting a pressure upon said razor blade when the upper member is in closed position and means for imparting a revolvable movement to said holder, a portion of said last named means being exterior of said casing.

15. A razor sharpener comprising a casing having a lower member and an upper member, abrading means within said lower member providing a sharpening surface, a holder to receive said razor blade whereby the cutting edges of the latter are placed in contact with said sharpening surface, means located within said upper member for exerting a pressure on said razor blade when said upper member is placed in normal position and means for imparting a revolvable movement to said holder.

16. A razor blade sharpener comprising two spaced abrading members providing juxtaposed and oppositely inclined sharpening surfaces, means for holding a razor blade in spring pressed relation against said sharpening surfaces and spaced actuating members acting individually for imparting a positive revolvable movement to said razor blade whereby the cutting edges thereof are brought into engagement with said sharpening surfaces.

17. A grinding device for the simultaneous sharpening of all four edge-surfaces of a double-edge razor blade, comprising a casing having an upper and a lower member, two comb-like interrupted grinding members longitudinally arranged in each of said casing members, said grinding members of each casing member having oppositely and inwardly inclined sharpening surfaces and being disposed to be superposed to the grinding members of said other casing member in the closed state of said casing, spring means adapted to resiliently hold said superposed grinding members in a position wherein the projecting surface portions of a grinding member extend into the intermediate spaces of the superposed member, a holder to receive a razor blade, said holder being disposed intermediate said grinding members, and drive means for imparting a curvilinear movement to said blade holder whereby said cutting edges of said blade are reciprocated wedge-like between said superposed grinding members, said drive means comprising a peripherally grooved roller disposed to actuate said holder, an operating cord extending out from opposite ends of said lower casing member, and means for guiding said cord around said roller so as to peripherally engage the groove of said roller.

18. A grinding device for double-edge razor blades, comprising a casing having an upper and a lower member, two spaced grinding members with comb-like interrupted inwardly inclined sharpening surfaces longitudinally arranged in each of said casing members for the simultaneous treatment of all four edge-surfaces of a blade, two longitudinally spaced lugs disposed in said lower casing member centrally of said sharpening surfaces to hold a safety razor blade whereby the cutting edges of the latter are placed in engagement with said sharpening surfaces, an intermediate peripherally grooved roller revolvably mounted in said lower member between said lugs, means for operatively connecting said intermediate roller with said two lugs so as to actuate said lugs by a simultaneous and similar movement having a longitudinal and a reciprocatory component, an operating cord extending out from the opposite ends of said lower casing member, and guide means for causing said cord when actuated to operatively engage said roller.

19. A grinding device for double-edge razor blades, comprising a casing having an upper and a lower member, grinding members in said lower member having oppositely inclined sharpening surfaces, means for guiding said grinding members in said lower member so as to be capable of a raising and lowering and of a pendulous movement for varying the grinding angle, spring means for pressing said grinding members against the cutting edges of said blade, a razor blade holder disposed intermediate said grinding members, grinding means located in said upper member so as to exert a pressure on said razor blade when said upper member is placed against said lower member, and drive means for imparting to said holder a curvilinear movement having a longitudinal component in order to displace said blade in the direction of the cutting edges and a transversal component in order to reciprocate the cutting edges of said razor blade in contact with said sharpening surfaces and to cause said grinding members to exert said pendulous movement whereby the grinding angle is decreased when said blade moves toward a grinding member and increased when said blade moves back.

20. A razor blade sharpener comprising a casing having a lower member and an upper member, two spaced abrading members held within said lower member and providing inwardly inclined sharpening surfaces, said sharpening surfaces being comb-like interrupted and superposed in such a manner that at times the projecting portions of a surface extend into the intermediate spaces of the superposed surface, springs for pressing said abrading members against the edges of a blade to be sharpened, means for guiding said abrading members in said lower casing member so as to be capable of a raising and a lowering and of a pendulous movement for varying the grinding angle, a movable holder to receive said razor blade whereby the cutting edges of the latter are placed in contact with said sharpeneing surfaces, means in said upper casing member for exerting pressure on said razor blade when said upper member is placed in normal position, and revolvable drive means for actuating said movable holder, whereby the edges of said blade are reciprocated over said sharpening surfaces and said abrading members are caused to effect said pendulous movement in dependenecy upon the direction of said reciprocatory movement.

21. A grinding device for double-edge razor blades, comprising a body of elongated shape having an upper and a lower member, said lower member having a hole in each of its longitudinally opposite ends, two longitudinally arranged pairs of grinding means having comb-like interrupted and inwardly inclined grinding surfaces for simultaneously operating on the four sides of the cutting edges of a blade, one of said grinding means of each pair being arranged in said upper member and the other in said lower member, springs for effecting a relative movement towards each other of the grinding means of each pair, a plate fixedly mounted in said lower member, said plate forming a guide for the grinding means of said lower member, said guide being designed to allow said means a pendulous as well as a raising and lowering movement, two longitudinally spaced lugs disposed in said lower member centrally of the grinding means of said lower member for engaging a blade to be sharpened, an intermediate peripherally grooved roller revolvably mounted in the center of said lower casing member, means for operatively connecting said roller with said lugs, said connecting means being designed to impart to said lugs a simultaneous and similar movement having a longitudinal and a reciprocatory component, an operating cord engaging the groove of said roller and extending through said holes in said lower casing member, two grooved disks arranged at opposite sides of said roller between said roller and said holes so as to cause said cord when in operation to frictionally actuate said roller and said lugs, whereby the blade placed upon said lugs is reciprocated between the grinding surfaces against the action of said springs, and said means are caused to exert said pendulous movement.

22. In a grinding device for double-edge razor blades, a casing having holes in the opposite ends thereof, longitudinally arranged and inwardly inclined grinding means for simultaneously operating on the four sides of the cutting edges of a blade, in combination with mechanism for presenting in both longitudinal and transverse directions points on each cutting edge of the blade to different points on said grinding means, said mechanism comprising a peripherally grooved roller, an operating cord engaging the groove of said roller and extending through said holes in the opposite ends of said casing for manually actuating said roller, two guides for said cord one of which is positioned between said roller and one hole of the casing and the other of which is positioned between said roller and the other hole of the casing, said guides being so located with respect to said roller as to cause said cord when operated to frictionally engage a substantial portion of the periphery of said groove, devices adapted to engage the blade and to maintain the cutting edges of said blade during the grinding movement in parallel relation to said longitudinally arranged grinding means, and means actuated by said roller for operating said devices and the blade engaged thereby so as to effect said grinding movement.

23. In a grinding device for double-edge razor blades, a lower and an upper member, longitudinally arranged and inwardly inclined grinding means secured to each of said members for simultaneously operating on the four sides of the cutting edges of a blade, in combination with mechanism for presenting in both longitudinal and transverse directions points on each cutting edge of the blade to different points on said grinding means, said mechanism comprising a grooved roller, an operating cord engaging the groove of said roller and passing through the opposite ends of one of said members for manually actuating said roller, guide means for said cord comprising two peripherally grooved rotatable disks located on opposite sides of and adjacent to said roller, said disks being so positioned with respect to said roller as to cause said cord when operated to frictionally engage a substantial portion of the periphery of the groove of said roller, devices for engaging the blade in order to impart the operating movement to the blade, said devices being adapted to maintain when in operation said blade longitudinally of said grinding means, and means actuated by said roller for operating said devices.

24. In a grinding device for double-edge razor blades, two pairs of longitudinally arranged and inwardly inclined grinding members, one pair adapted to simultaneously operate on the two sides of one cutting edge of a blade and the other pair adapted to simultaneously operate on the two sides of the other cutting edge of said blade, the said grinding members being provided with comb-like interrupted grinding surfaces and each pair being superimposed in such manner that the projecting portions of the grinding surfaces of one grinding member of said pair are adapted to extend into the intermediate spaces of the grinding surfaces of the opposed grinding member of said pair, and spring means for effecting a relative movement towards each other of the grinding members of each pair of said members, said spring means and cooperating parts also providing a pendulous movement of said grinding members of each pair with respect to each other to decrease the angle between the inclined grinding surfaces of said pair as the blade advances towards said angle and to increase said angle as the blade executes a return movement, in combination with mechanism for presenting in both longitudinal and transverse directions points on each cutting edge of the blade to different points on said grinding members, said mechanism comprising devices adapted to engage the blade and to maintain the same longitudinally of said grinding members, and means for actuating said devices and the blade engaged thereby.

25. In a grinding device for double-edge razor blades, a casing having holes in the opposite ends thereof, two longitudinally arranged pairs of grinding means in said casing having inwardly inclined grinding surfaces for simultaneously operating on the four sides of the cutting edges of a blade, in combination with mechanism for moving a razor blade over the surfaces of said grinding members, said mechanism including means for alternately forcing in a reciprocatory wedge-like movement first one cutting edge of the blade between a pair of said grinding means and thereafter similarly forcing the other cutting edge of said blade between the other pair of grinding means, said reciprocatory means comprising a peripherally grooved roller, an operating cord engaging the groove of said roller and extending through said holes in the opposite ends of said casing for manually actuating said roller, two guides for said cord one of which is positioned between said roller and one hole of the casing and the other of which is positioned between said roller and the other hole of the casing, said guides being so positioned with respect to said roller as to cause said cord to frictionally engage a substantial portion of the periphery of said groove, and means actuated by said roller for operating said reciprocatory means and the blade engaged thereby.

FERDINAND SOUCZEK.